US011349637B2

(12) United States Patent
Manevich et al.

(10) Patent No.: US 11,349,637 B2
(45) Date of Patent: May 31, 2022

(54) RANDOM NODE SELECTION FOR PERMISSIONED BLOCKCHAIN

(71) Applicant: International Business Machines Corporation, Armonk, NY (US)

(72) Inventors: Yacov Manevich, Haifa (IL); Artem Barger, Haifa (IL); Hagar Meir, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 16/673,911

(22) Filed: Nov. 4, 2019

(65) Prior Publication Data

US 2021/0135847 A1    May 6, 2021

(51) Int. Cl.
| | |
|---|---|
| *H04L 29/06* | (2006.01) |
| *H04L 9/06* | (2006.01) |
| *G06F 3/06* | (2006.01) |
| *H04L 9/08* | (2006.01) |

(52) U.S. Cl.
CPC ............ *H04L 9/0637* (2013.01); *G06F 3/062* (2013.01); *G06F 3/064* (2013.01); *G06F 3/067* (2013.01); *H04L 9/0643* (2013.01); *H04L 9/0869* (2013.01)

(58) Field of Classification Search
CPC ... H04L 9/0637; H04L 9/0643; H04L 9/0869; G06F 3/062; G06F 3/064; G06F 3/067
See application file for complete search history.

(56) References Cited

U.S. PATENT DOCUMENTS

| | | | |
|---|---|---|---|
| 2015/0379510 | A1 | 12/2015 | Smith |
| 2016/0260171 | A1 | 9/2016 | Ford et al. |
| 2016/0299918 | A1 | 10/2016 | Ford |
| 2018/0309567 | A1 | 10/2018 | Wooden |
| 2019/0104196 | A1 | 4/2019 | Li et al. |
| 2019/0253242 | A1* | 8/2019 | MacBrough ............ H04L 9/085 |
| 2019/0279241 | A1* | 9/2019 | DiTomaso ............ H04L 9/3239 |
| 2019/0303621 | A1* | 10/2019 | Baset ................. G06Q 20/3827 |
| 2019/0394023 | A1* | 12/2019 | Menon .................. H04L 9/3242 |
| 2021/0103581 | A1* | 4/2021 | Lee ..................... G06F 16/2365 |

FOREIGN PATENT DOCUMENTS

WO    2019072297 A3    7/2019

OTHER PUBLICATIONS

Androulaki et al., "Hyperledger Fabric: A Distributed Operating System for Permissioned Blockchains", Apr. 17, 2018.

* cited by examiner

*Primary Examiner* — Malcolm Cribbs

(57) ABSTRACT

An example operation may include one or more of retrieving a block hash of a data block stored on a blockchain, randomly determining a subset of peer organizations from a blockchain network of the blockchain to be endorsers based on a value of the block hash, transmitting a blockchain storage request from a client to the randomly determined subset of endorser peer organizations, and collecting simulated responses from the randomly determined subset of endorser peer organizations into a storage request proposal.

20 Claims, 21 Drawing Sheets

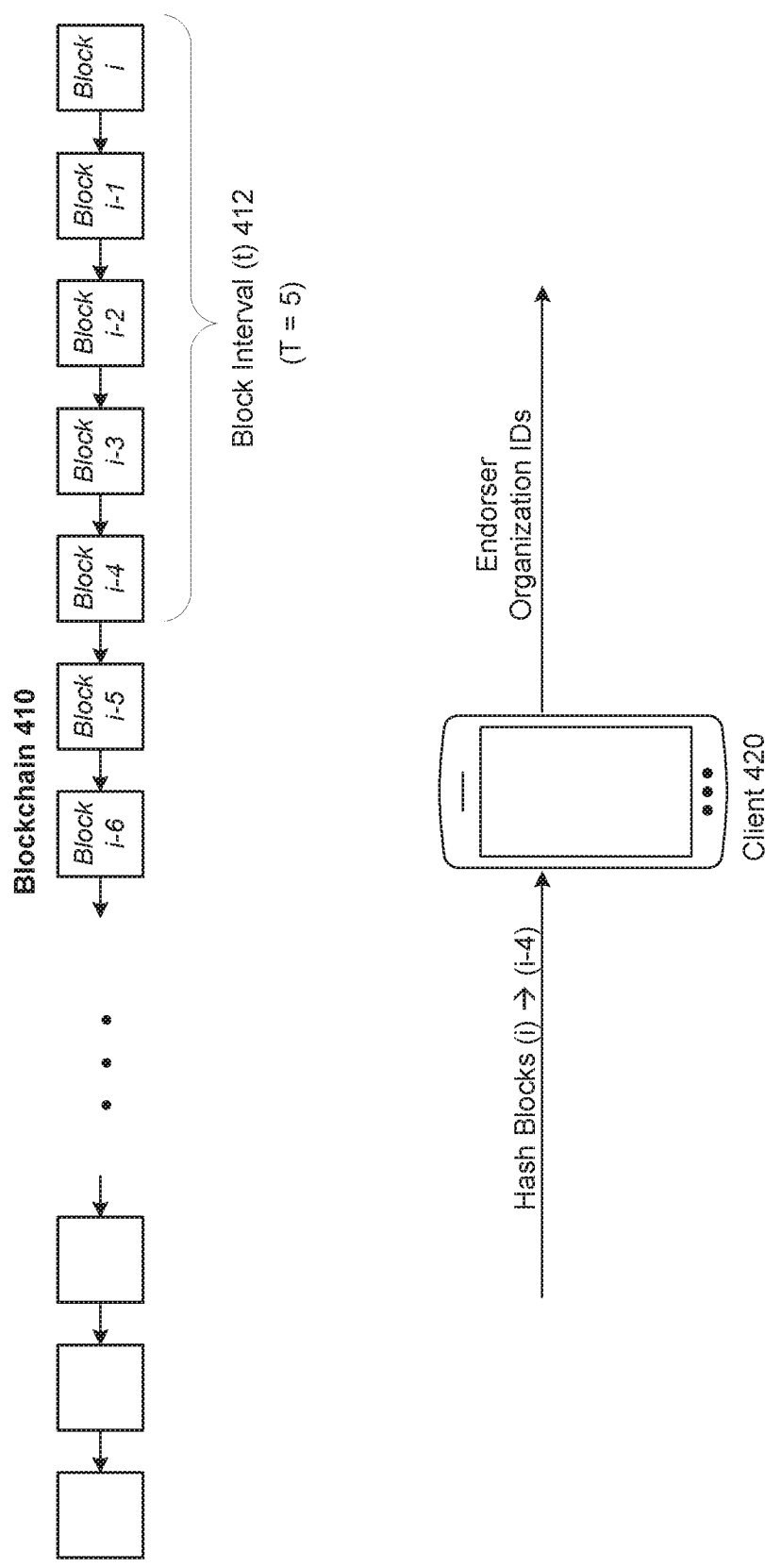

Block Hash (256 bits) — 430

44xy290gh1095sw2e4th99p5812322thgbq893bvs2396 . . .

Pseudo Random Binary Number (256 bits) — 440

1011100010010100101110101100100010111011 00 . . .

N = 16 Peer Organizations

Unique IDs 450

Organization 1 = 0
Organization 2 = 1
Organization 3 = 2
Organization 4 = 3
Organization 5 = 4
Organization 6 = 5
Organization 7 = 6
Organization 8 = 7
Organization 9 = 8
Organization 10 = 9
Organization 11 = 10
Organization 12 = 11
Organization 13 = 12
Organization 14 = 13
Organization 15 = 14
Organization 16 = 15

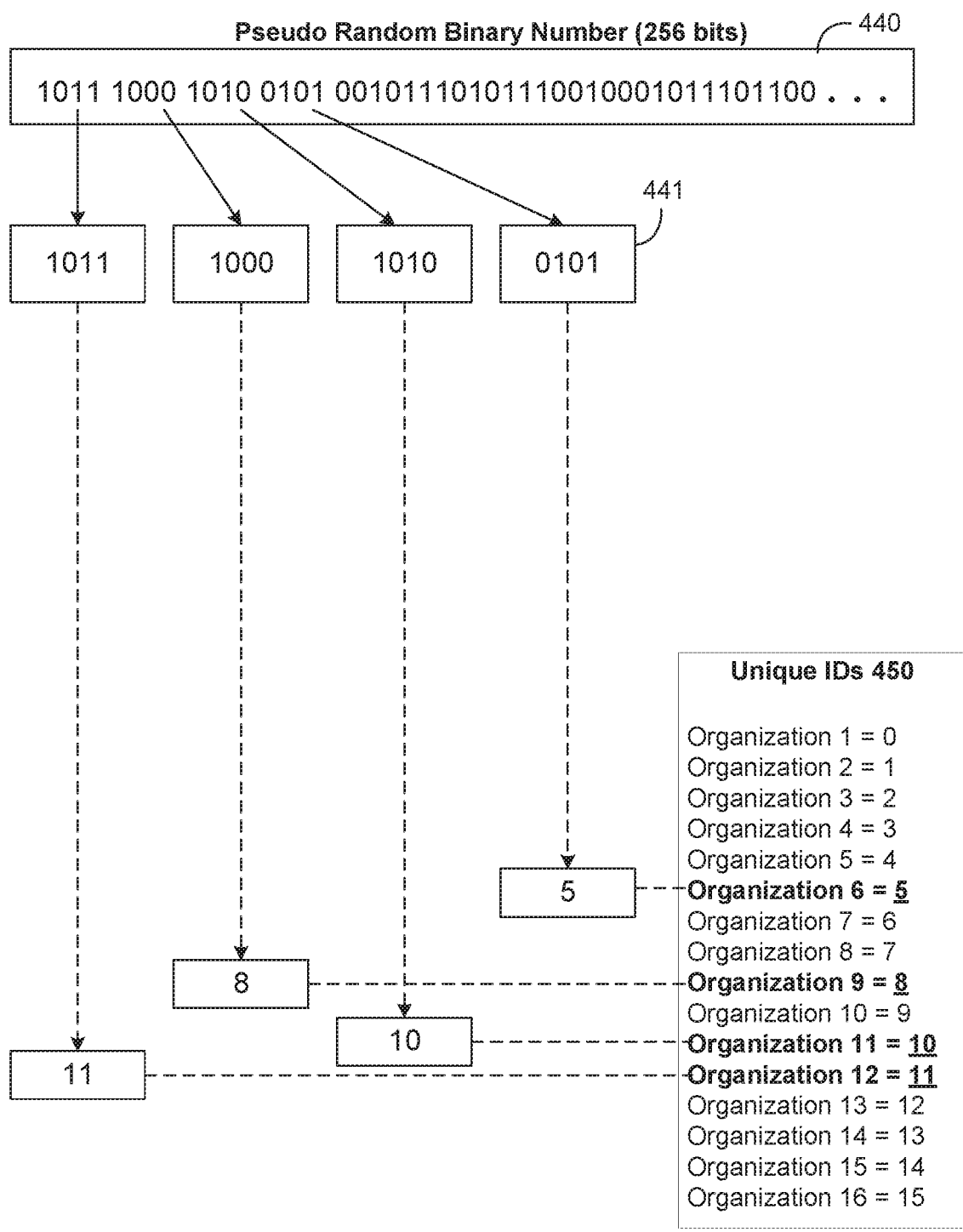

RANDOM NODE SELECTION FOR PERMISSIONED BLOCKCHAIN

TECHNICAL FIELD

This application generally relates to storing data on a blockchain, and more particularly, to a process of randomly selecting a subset of peer nodes from a permissioned blockchain to perform endorsement based blockchain data.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

One type of blockchain is the permissioned blockchain which follows an execute, order, and validate paradigm. In this environment, client transactions are speculatively executed by a subset of peers (endorser nodes) which send results of the simulated execution back to the client which uses the results as input to a transaction proposal for storage on the blockchain. The transaction may be ordered and then added to a block that is committed by the peer nodes to the blockchain ledger. Here, the committing nodes may verify the signatures of the endorser nodes and also execute the transaction once again. As a blockchain network expands, the number of nodes needed to endorse a transaction may grow as well. The result is a trade-off in performance for increased security. In particular, more nodes/signatures needed for endorsement means a more secure transaction. However, it also means there are more signatures to verify at commit time. As such, what is needed is a solution that overcomes these drawbacks and limitations.

SUMMARY

One example embodiment provides a system that includes one or more of a processor configured to one or more of retrieve a block hash of a data block stored on a blockchain, randomly determine a subset of peer organizations from a blockchain network of the blockchain to be endorsers based on a value of the block hash, and transmit a blockchain storage request from a client to the randomly determined subset of endorser organizations, and a network interface configured to collect simulated responses from the randomly determined subset of endorser organizations into a storage request proposal.

Another example embodiment provides a method that includes one or more of retrieving a block hash of a data block stored on a blockchain, randomly determining a subset of peer organizations from a blockchain network of the blockchain to be endorsers based on a value of the block hash, transmitting a blockchain storage request from a client to the randomly determined subset of endorser peer organizations, and collecting simulated responses from the randomly determined subset of endorser peer organizations into a storage request proposal.

A further example embodiment provides a non-transitory computer-readable medium comprising instructions, that when read by a processor, cause the processor to perform one or more of retrieving a block hash of a data block stored on a blockchain, randomly determining a subset of peer organizations from a blockchain network of the blockchain to be endorsers based on a value of the block hash, transmitting a blockchain storage request from a client to the randomly determined subset of endorser peer organizations, and collecting simulated responses from the randomly determined subset of endorser peer organizations into a storage request proposal.

BRIEF DESCRIPTION OF THE DRAWINGS

FIG. 4A is a diagram that illustrates a process of retrieving a hash from a blockchain for use in randomly selecting endorser organizations according to example embodiments.

FIG. 4B is a diagram that illustrates a process of assigning unique identifiers to organizations in a blockchain network according to example embodiments.

FIG. 4C is a diagram that illustrates a process of breaking up a hash into segments and identifying endorser organizations based on the segments according to example embodiments.

DETAILED DESCRIPTION

Figure 1:
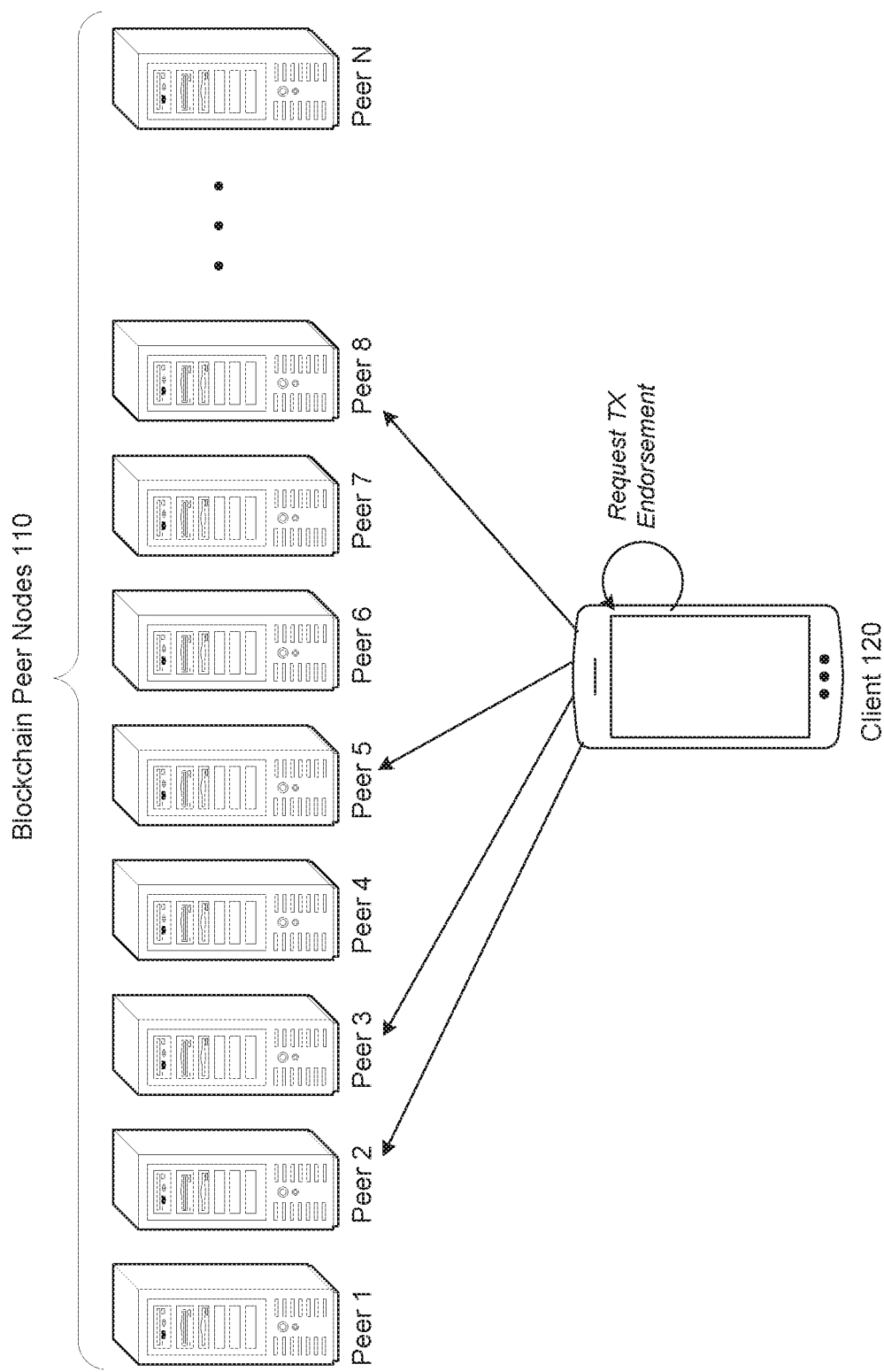
FIG. 1 is a diagram that illustrates a computing environment for randomly selecting peer organizations for endorsement according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which are directed to a randomized selection process for endorser nodes in a permissioned blockchain.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

According to various embodiments, endorser organizations (e.g., having blockchain peer nodes) may be randomly selected, for example, by a client, a peer node, etc., based on data (e.g., hash value of a data block, etc.) that is already stored on the blockchain ledger. The randomized selection of the organizations can be performed using a process which is known by members of the blockchain. Remaining member nodes can verify the random selection of endorser organizations by performing the same process using the same hash of the data thus ensuring the integrity of the randomization of endorser organization selection.

Some benefits of the instant solutions described and depicted herein include reducing the amount of data that needs to be stored in a transaction within larger permissioned blockchain networks that are of the execute-order type. In particular, by selecting a random subset of peer organizations, the possibility of an attacker to mount an attack on those randomly selected organizations ahead of time is very low. Thus, less organization are needed for a safe endorsement policy. In addition, the instant solutions improve security of the peers because an attacker hacking into peers must figure out a random peer selection process, prior to its occurrence, which is very difficult.

Some permissioned blockchains follow the execute-order-validate paradigm, where instead of all peers executing the transactions at the time of block validation, the transactions are speculatively executed on a subset of the peers (e.g., endorser nodes) in the network, and the computation results such as the expected changes in the data) are signed by the executing peers after which they are sent to ordering nodes which batches the transactions into blocks. At commit time, the blocks are transmitted to peer nodes where each peer node verifies the execution results are correct as long as they are properly signed.

An example of such a permissioned blockchain is Hyperledger Fabric, where a client uses a software development kit (SDK) which sends transaction proposals containing a name of a smart contract and an input to the smart contract transaction to endorser peer nodes. The endorsers speculatively execute the transaction, sign over the read-write sets (also known as "endorsements") and transmit the endorsements back the client which uses the endorsements to construct a transaction. Transactions are then sent by clients to an ordering service that batches the transactions into blocks. The blocks are disseminated to peers which validate aspects of the transaction execution including whether the execution results were signed by an acceptable subset of the peers, and whether the transaction's read set hasn't changed since its speculative execution. The former is called an "endorsement policy", and its role is to enforce that the transaction was correctly executed on enough peers according to the security assumptions of the network, and sometimes also taking in account the business relations that the transaction is tied to.

Having a trusted core of organizations/peer nodes in the blockchain network which perform every endorsement can ensure the soundness of all transaction executions, however, this requires unreasonable trust assumptions that are contradictory to the very essence of blockchain networks, where complete trust in foreign parties is non-existent.

As a non-limiting example, a blockchain network may require that a transaction between counter-parties be endorsed by peers in several administrative domains. In an agreement in which company A transfers money to company B, it is typical to have the transaction simulated and signed by peers of company A and peers of company B, as well as by peers of some auditor organization such as company C. In this example, companies A and B would want to ensure that their balances are updated accordingly to the business transaction, and the auditor's peers are often involved so that the total amount of circulating money in the system stays the same otherwise, peers A and B can maliciously come to an agreement where money isn't deducted from company A's account, while company B's account is increased. Therefore, a peer from each of the corresponding organizations (A, B, and C) may be required to endorse the transaction in order for it to be considered valid by all peers in the network, and therefore its execution results to be applied at commit time.

While this endorsement policy is well bound to the business process, it may not be suitable for all threat models, particularly a threat model that considers organizations to be hacked by other organizations. If in this example, organization A or B hack into the auditor organization C, the hacking part can collude and construct a transaction execution result where the account balance of A is left intact and the account balance of B is increased, and have the (compromised) peer of organization C sign the execution result and the transaction would be then deemed valid by all the peers in the network. To that end, it is common to increase the variety of organizations that need to sign the transaction, and by doing so, to increase the difficulty of attaining enough (compromised and malicious) organizations in order to endorse an illegal transaction execution.

As a blockchain network expands and more organizations join, a trade-off between security and performance occurs. For example, the more signatures needed from different organizations in order for a transaction to be deemed valid, the more secure the endorsement policy becomes. However, it also means there are more signatures to verify at commit time, and more signatures also means the public keys (and in Hyperledger Fabric, the entire x509 certificate) also need to be present in the transaction, which increase its size, and this increases the overall execution load on the endorser peers. Each of these three factors (more signature verification, bigger transactions, additional transaction execution and signing) create a detrimental effect on the system performance. Furthermore, the more organizations in the network, the easier (more opportunities) there are for an attacker to hack into an organization, or influence an organization to collude, and the fewer signatures from different organizations needed, the easier it becomes for an attacker to mount an attack.

Another plausible use case is one that entails a blockchain network with a large number (dozens or even a hundred) of organizations which don't fully trust each other, but still want to ensure correct smart contract execution in the execute-order paradigm. For this example, an endorsement policy that includes a majority of organizations, or in fact any endorsement policy that is somewhat linear in the number of organizations is impractical from a performance and scalability point of view. As a result, an endorsement policy that requires a constant number of organizations (e.g., 10 out of 100 organizations) to endorse is the only viable solution, however it is very possible that the relatively small number of organizations can be hacked, or may collude to forge a transaction that wasn't executed according to the smart contract business rules in order to promote their mutual interests, thus compromising the data integrity of the network.

An important enabler of such an attack, is the fact that the client that submits the transaction proposals to the peers (for endorsement) has complete freedom in choosing the endorsers, hence the client can play an active role as an accomplice in the outlined attack. Had the committing peers been able to force the client to choose a random subset of the endorsing peers, this concern could be mitigated. Furthermore, the blockchain cannot rely on randomness to be selected by the client itself, else it can just re-iterate the (random) selection, until the selection yields the desired corrupted peers. Instead, the randomness must come from a source that the client does not fully control (and which can be subsequently verified).

The example embodiments introduce randomness into the endorser peer organization selection process by requiring a client (or some other entity such as a peer node) to randomly choose peer organizations from the network based on a known algorithm executing on known/verifiable data that is already stored on the blockchain. Based on the number of organizations in a blockchain network, unique identifiers (numerical values) can be assigned to each of the organizations. To select a subset of the endorser organizations from the blockchain network, a client may be required to use a block hash value from a previous group of blocks. The block hash can be used to generate a random number (e.g., a binary number). The binary random number may be segmented into segments of bit values. A first bit value may be sliced off of the binary random number and converted into a decimal value that may be mapped directly or indirectly to a unique identifier of an organization. This process can be repeated (another slice taken off the binary random number) until enough endorser organizations are determined randomly. The client may then rely on these endorser nodes to perform endorsement of a transaction.

Another benefit described in the instant solution is the use of a block interval which essentially specifies a subset of blocks (most recently stored blocks) on the blockchain that can be used as the block hash. A client may retrieve a current height of the blockchain ledger and generate an integrity value that is based on the current height of the blockchain ledger divided by the block interval value. The resulting integrity value may be stored with the transaction and may be used to verify that the client selected a block from among the most recently stored blocks on the blockchain ledger as indicated by the block interval.

FIG. 1 illustrates a computing environment 100 for randomly selecting peer nodes for endorsement of a transaction according to example embodiments. Referring to FIG. 1, the computing environment 100 includes a permissioned blockchain that has N peer nodes 110. In this example, any of the N peer nodes 110 can serve as endorsers of a transaction. Each peer takes part in its own organization (not shown in the figure), e.g., peer 1 is in organization 1, peer 2 is in organization 2, etc. According to various embodiments, a client 120 may be forced to randomly select a subset of peer organizations and subsequently a peer node from the group of N peer nodes 110 to perform an endorsement. Furthermore, the process of randomly determining which peer organizations to choose may be based on verifiable data that is already stored on the blockchain such as a block hash value, or multiple block hash values as described in the examples of FIGS. 4A-4C. In the example of FIG. 1, the client 120 randomly chooses peers 2, 3, 5, and 8, from among the N peer nodes 110.

In some embodiments, the logic for performing the random selection may be built into a software development kit (SDK) of the client 120 which fetches a latest block (or a block from among a most recently stored subset of blocks) from a peer node or orderer and then uses the information to compute the randomized selection of organizations. As another example, the logic for performing the random selection may be built into a trusted peer that the SDK can query, and acts as a service that computes the selection for the client. Furthermore, each of the N peer nodes 110 may include the random selection process built therein so that when it comes time to commit a transaction (and its corresponding block) to the blockchain, the N peer nodes 110 can also validate the random selection process.

For example, a block hash may be generated by a hash function such as SHA-256, MDS, or the like. The resulting hash value is a string of letters and characters that has a particular size such as 128 bits, 256 bits, 512 bits, etc. According to various embodiments, the hash value may be used to generate a binary random number such as through a pseudo-random number generator (PRNG). The resulting binary random number may include the same number of bits as the block hash, but instead of a combination of letters and numbers, the random number may include only binary numbers one (1) and zero (0). For example, a 64 bit hash value is shown below.
Hash=as7r430pohvb21msw98210pplhnmbn30431 trewq9820pksgreder084321abyx09

Here, the block hash may act as a seed value to the PRNG which converts the hash value into a binary random number. For example, the PRNG may include an algorithm for generating a sequence of binary numbers whose properties approximate the properties of sequences of binary random numbers. The PRNG-generated sequence is not truly random, because it is completely determined by an initial value (block hash) which is referred to as the PRNG's seed (which may include truly random values). An example of the binary PRNG created from the hash above is shown below:
PRNG=110010100010111010001011010100101100 10100100100101010010001

The random peer selection process may be performed based on the value of the PRNG created from the block hash. For example, each peer organization from among the N peer organizations 110 may be assigned a unique identifier based on how many peer organizations are included in the network. The unique identifiers may be numerical (decimal, etc.). For example, each of the N organizations can be assigned a unique identifier from 0 to N−1. Meanwhile, data segments/chunks can be removed from the PRNG which is in binary format, and converted into decimal form. The size of the data segment may be log 2(N) bits, or log at the base of 2 which corresponds to the inverse function of $f(x)=2^x$. For example, if the number of peer organizations is twenty (i.e., N=20), each peer organization may be assigned a unique value from 0 to 19, and the data segment size may be log 2(20)=4.32 which is rounded up to 5 bits.

Accordingly, the first 5 bits may be removed from the PRNG, which in this example is 10001, and converted to decimal which is 17. This corresponds to the unique identifier of peer organization 18. If the system needs to select 5 endorser organizations, the process can be repeated until 5 different unique identifiers have been determined by taking additional bit segments off of the binary random number and running them through the process. If the binary random number runs out of bits before enough organizations are identified randomly, the block hash may be hashed again, and the process repeated, or another block hash may be selected and the process may be repeated.

The forced random peer selection may be included in an endorsement policy of a blockchain network, such as a blockchain network with a large number of organizations. As a result, it is impractical to hack enough organizations in order for the endorsement policy to be satisfied. The endorsement policy is not restricted to any particular set of organizations, but instead may include any large enough subset of organizations endorsing the same transaction execution that is deemed acceptable by the endorsement policy. It should also be appreciated that the techniques and mechanism described herein can be applied for other models where the organization selection is more narrow.

Furthermore, each of the N peer organizations can validate the random endorser node selection process. In other words, the committing peers may verify that the endorser nodes are indeed random. Because the hash that is used as the seed to generate the random number is determined from a block hash stored on the blockchain, the peer nodes in the blockchain network can retrieve the same block hash and perform the same binary random number generation. Then, each of the peers can segment the block hash and map the segments to unique organization IDs to ensure that the same organization IDs are selected by the client, thereby validating that the correct endorser nodes were selected based on their corresponding organizations derived from the binary random number.

For example, let N be the number of organizations, and K<N be a number of organizations that must endorse a transaction in order for the endorsement policy to be satisfied. In order to forge a transaction that can be validated by the network peers, an attacker would need to hack/persuade K out of N organizations, meaning the attacker can select any K organizations and target them. Yet, it is undoubtedly much harder to hack K organizations that were randomly selected for the attacker in a very short notice. The endorsement policy described herein forces an attacker to select only restricted combinations of K organizations (in contrast to selecting any k out of n organizations of his/her choice) which are chosen randomly, and the combinations of organizations may constantly (and randomly) change according to the content of the Blockchain itself, after every T blocks as further described below. For example, every consecutive sequence of T blocks, may be used to define a few combinations for selections of K out of N organizations, and for a transaction to be deemed valid, it needs to be endorsed by a combination of K organizations such that it is found in the last T blocks.

The "last T blocks" may be referred to herein as a target interval constraint where T is a block interval value. For example, the endorsement policy may include a constraint that in order for a transaction to be validly endorsed, the random peer selection process must be performed based on a block hash from the last T blocks stored on the blockchain. To verify this, a client or peer may include an integrity value into the transaction such as a current height of the ledger (H) divided by the block interval value (T). Then, at validation time, the committing peer checks that its current height (H) divided by T (and rounded to the nearest lowest integer) is equal to that number, and if not, the transaction is deemed invalid. This constraint dictates that a transaction cannot be held for too long by the client, before it is submitted to be included in a future block, and essentially it makes a transaction simulated at height H to be invalid if it gets into a block after the Blockchain has advanced further than T blocks. The use of this constraint can increase security guarantees by a large extent.

According to various embodiments, based on the changes provided herein, if the attacker wants to forge a transaction, the attacker would be forced to take over organizations chosen randomly, which may be unattainable due to the time it takes to take over the organizations. Here, new T blocks may have already been formed and if the forged transaction would be formed from the endorsements of the old organizations (before T blocks have been formed), it will be invalidated at commit time, because the set of endorsers of the transaction will not be found in any combination of organizations induced by the last T blocks. As another option, the attacker may need to take over organizations selected upfront, and wait for T blocks to be formed that declare endorsements from that pre-prepared set of endorsers as valid. However, this may take a long time to happen or never happen at all. This is also stunted by recording the integrity value of the transaction into the block which corresponds to a blockchain height divided by the block interval value T. This would require the attacker to guess the right interval of T blocks that would induce its pre-prepared set of endorsers. Yet if other (non-malicious) parties are submitting transactions to the blockchain, it is impossible to predict the interval of T blocks beforehand, because it depends on random input (transactions chosen by honest parties, that contain randomness).

The example embodiments may generate a block hash using a secure hash function that outputs 256 bits (the technique can be modified to fit hash functions of various lengths), and denote the hashes of the last t consecutive blocks as $H_0, H_1, H_2, \ldots H_{T-1}$, and the organizations of endorsers as $O_0, O_1, O_2, \ldots, O_{N-1}$. To encode a unique organization ID, the system may use log 2(N) bits, and to encode K organizations, the system may acquire at least K numbers of log 2(N) bits. The hashes of the last T consecutive blocks define the first combination of the K organizations in the following manner: The system may initialize an empty set S of numbers to represent the IDs of the organizations, and take the lowest log 2(N) bits of a block hash (such as $H_{T-1}$) and denote it as B0, and add the numerical representation of B0 to S. The system may then take the next log 2(N) bits of the block hash and denote it as B1, and then if it exists in S, the system can discard it, otherwise the system can add it to S. Then the system may continue the process and move to the next log 2(N) bits of the block hash until it finds K distinct IDs or it runs out of bits in the block hash $H_{T-1}$. If the system does not have enough distinct IDs, the system can rehash the block hash or retrieve the previous block hash and start retrieving more unique IDs.

In an example in which a blockchain network includes 100 peer organizations in the network, and endorsements are needed from 10 organizations, N=100 and K=10. Moreover, the target interval constraint limits the block hash to be from the last 12 blocks, the block interval value is T=12. In this example, the last 12 blocks dictate the selection of organizations, meaning that for every transaction, there are up to T block hashes to use to identify the K organizations for endorsement. For example, the blockchain may sustain a throughput of 2000 transactions per second. In this example, an application has approximately 3 seconds to endorse a transaction and send it to be included in the next block. The probability that a single block hash will not contain 10 distinct numbers (meaning, all 32 sequences of 8 bits, when using hash size of 256 bits, will have less than 10 numbers overall) is very small, since there are 100 identifiers to choose from and 32 intervals of 8 bits. Furthermore, if the block hash yields less than K identifiers (which happens with a low probability as seen), the system may apply the hash over the block's hash once more and then continue using this hash. Alternatively, the number derivation can be done using a Pseudo-Random Number Generator (PRNG) with the block hash as the seed.

Figure 2A:
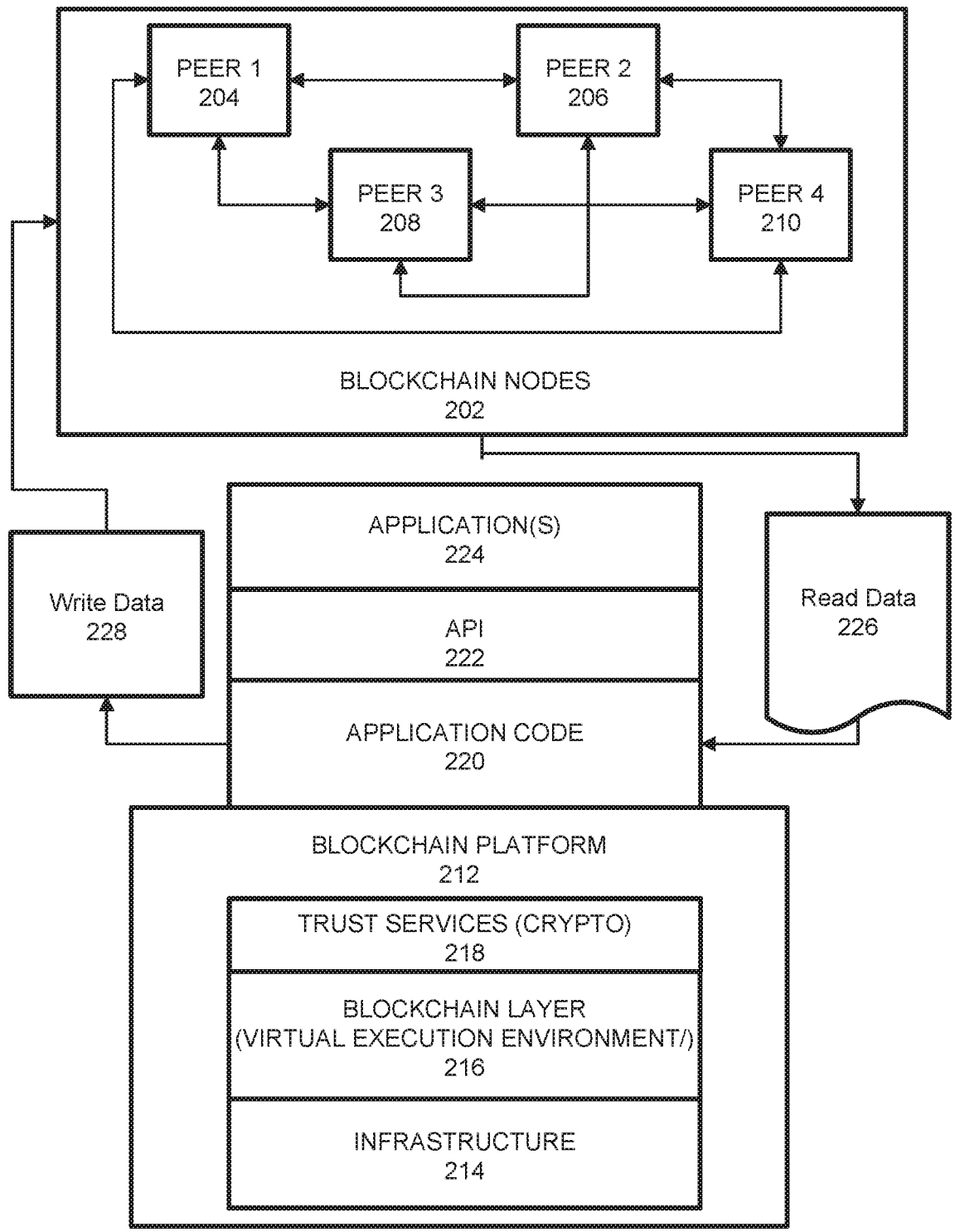
FIG. 2A is a diagram that illustrates a blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, read data 226 may be processed by one or more processing entities (e.g., virtual machines) included in the blockchain layer 216 to create processing results to be written to the blockchain which include write data 228. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
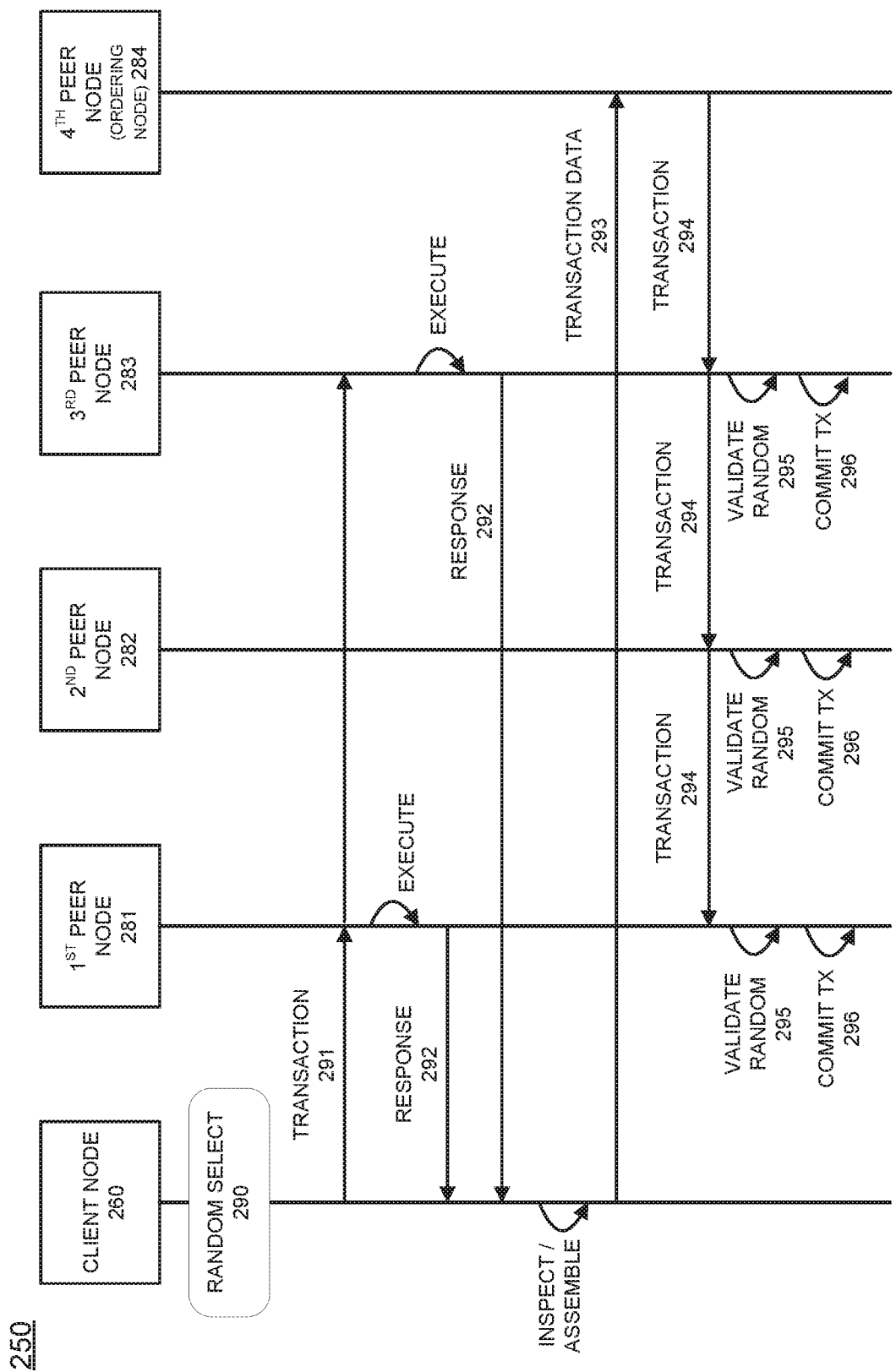
FIG. 2B is a diagram that illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to one or more endorsing peer nodes (e.g., peer nodes 281 and 283). According to various embodiments, the application client node 260 may randomly select endorsing peer organizations based on a hash value retrieved from a block of the blockchain (e.g., via a peer node, etc.) as described in the examples herein. For example, the block hash can be converted into a binary random number. The binary number can be broken up into bit segments which are sliced off of the binary random number and used to identify the endorsing peer nodes. The application client node 260 may identify K endorser nodes and transmit the transaction proposal 291 to the endorsing peer nodes. The endorsing peer nodes may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284 for consensus. The ordering service node 284 then orders transactions into blocks and disseminates the blocks to all peers 281-283 on a channel. Before committal to the blockchain, each peer 281-283 may verify that the endorser peer node selection process was indeed random, and validate the transaction. For example, the peers may perform their own random selection process based on the same block hash to verify the correct endorser nodes were selected, and also check the endorsement policy to ensure that the correct allotment of the specified peers have signed the results and authenticated the signatures against the transaction payload 293.

Referring again to FIG. 2B, in 290, the client node 260 randomly selects K endorser peer organizations (e.g., peer node 281 and peer node 283) based on a block hash of a block stored on the blockchain. The client node 260 initiates the transaction 291 by constructing and sending a request to the endorser peer nodes 281 and 283, which are randomly selected as endorsers in 290. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer nodes 281 and 283 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer nodes 281 and 283 may take the transaction proposal inputs as arguments to the invoked chaincode function. The chaincode is then executed against a current state database to produce transaction results including a response value, read set, and write set. However, no updates are made to the ledger at this point. In 292, the set of values, along with signatures of the respective endorsing peer nodes 281 and 283 is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the randomly selected endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid.

According to various embodiments, in step 295, each of the peer nodes 281-283 can verify the random endorser organization selection process performed by the client node 260. For example, each of the peer nodes 281-283 can check whether the transaction included in the block was simulated and endorsed by peers according to the random selection from 290. Furthermore, if the random selection is verified successfully, in step 296 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
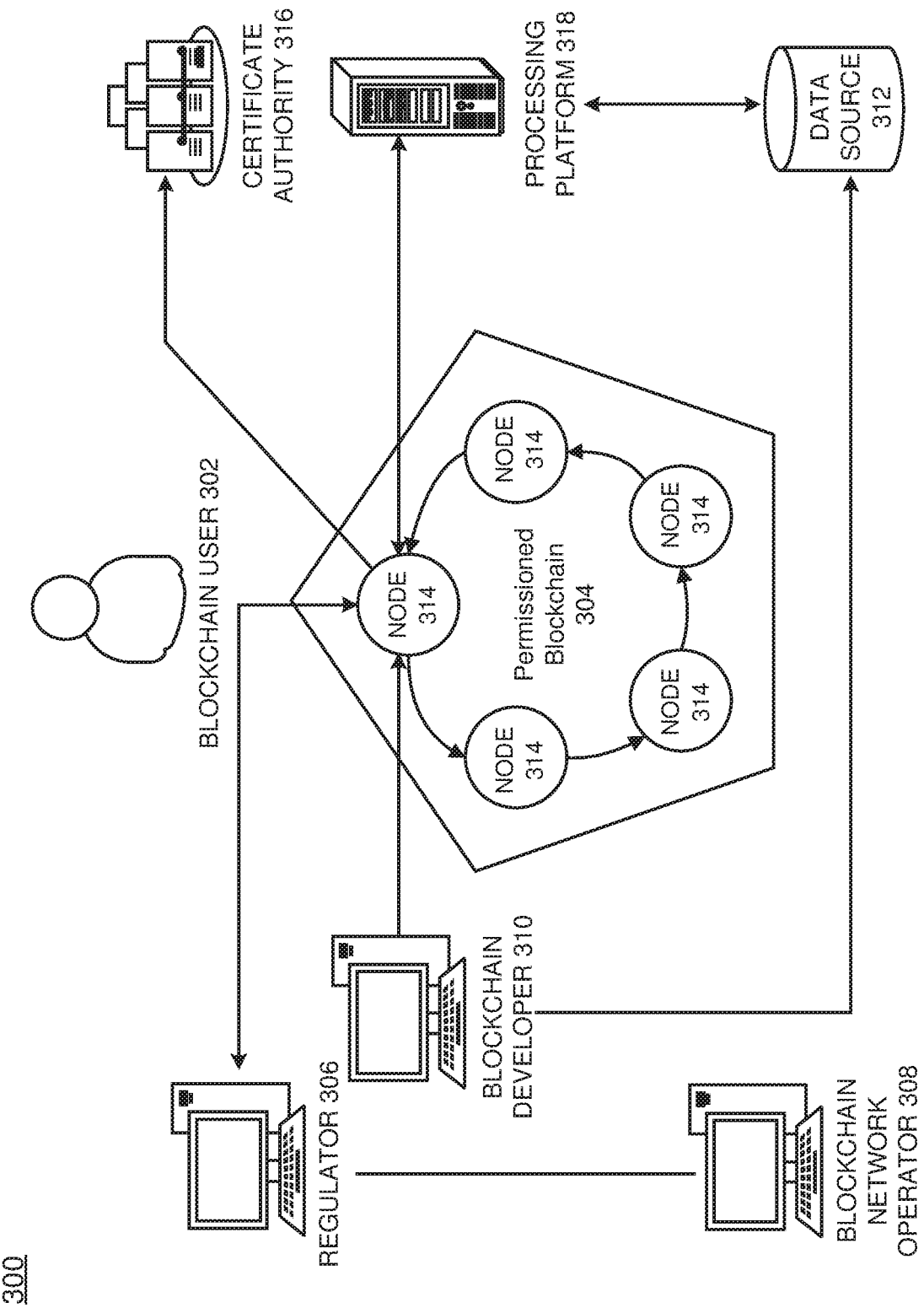
FIG. 3A is a diagram that illustrates a permissioned blockchain network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
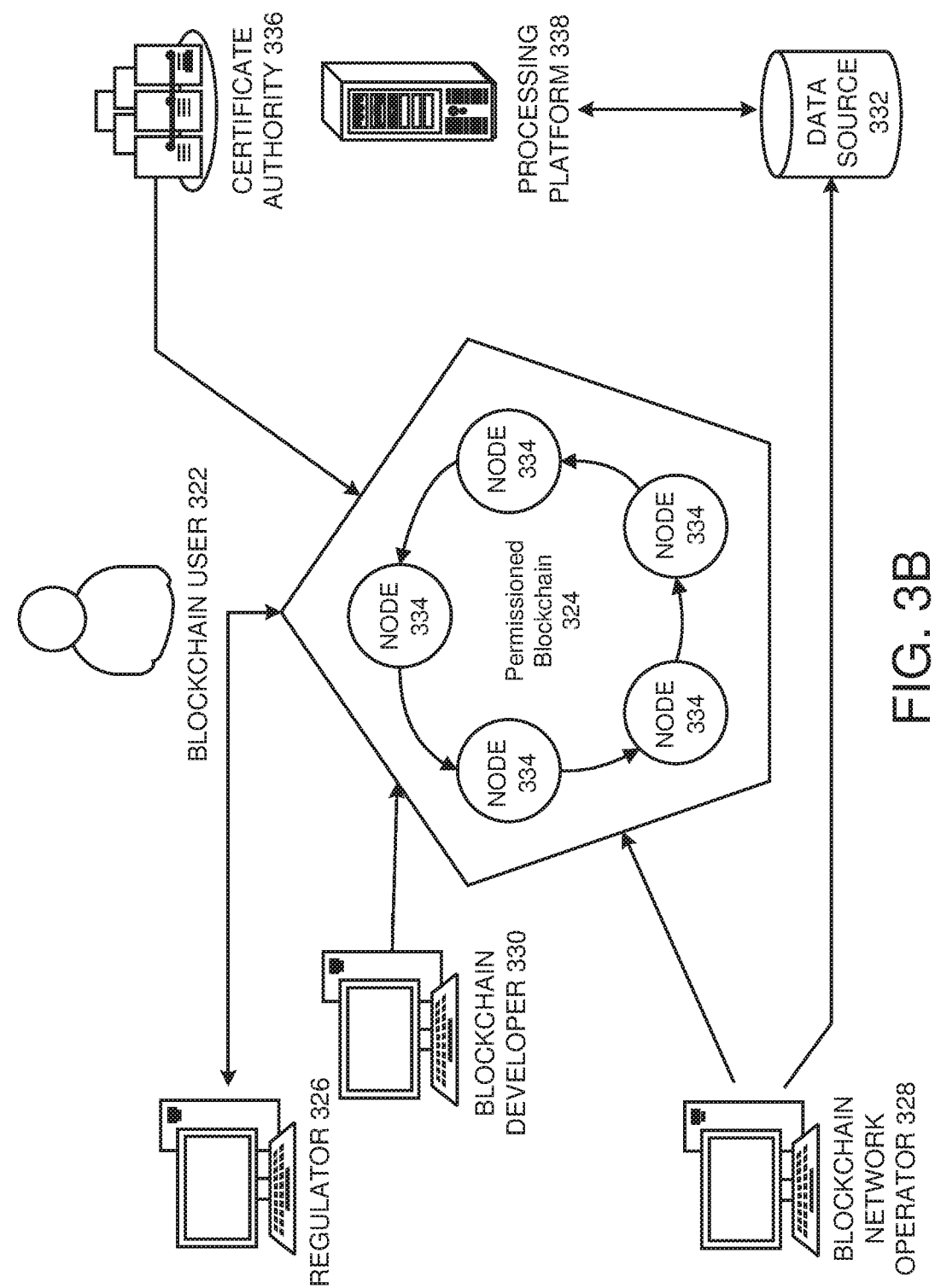
FIG. 3B is a diagram that illustrates another permissioned blockchain network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
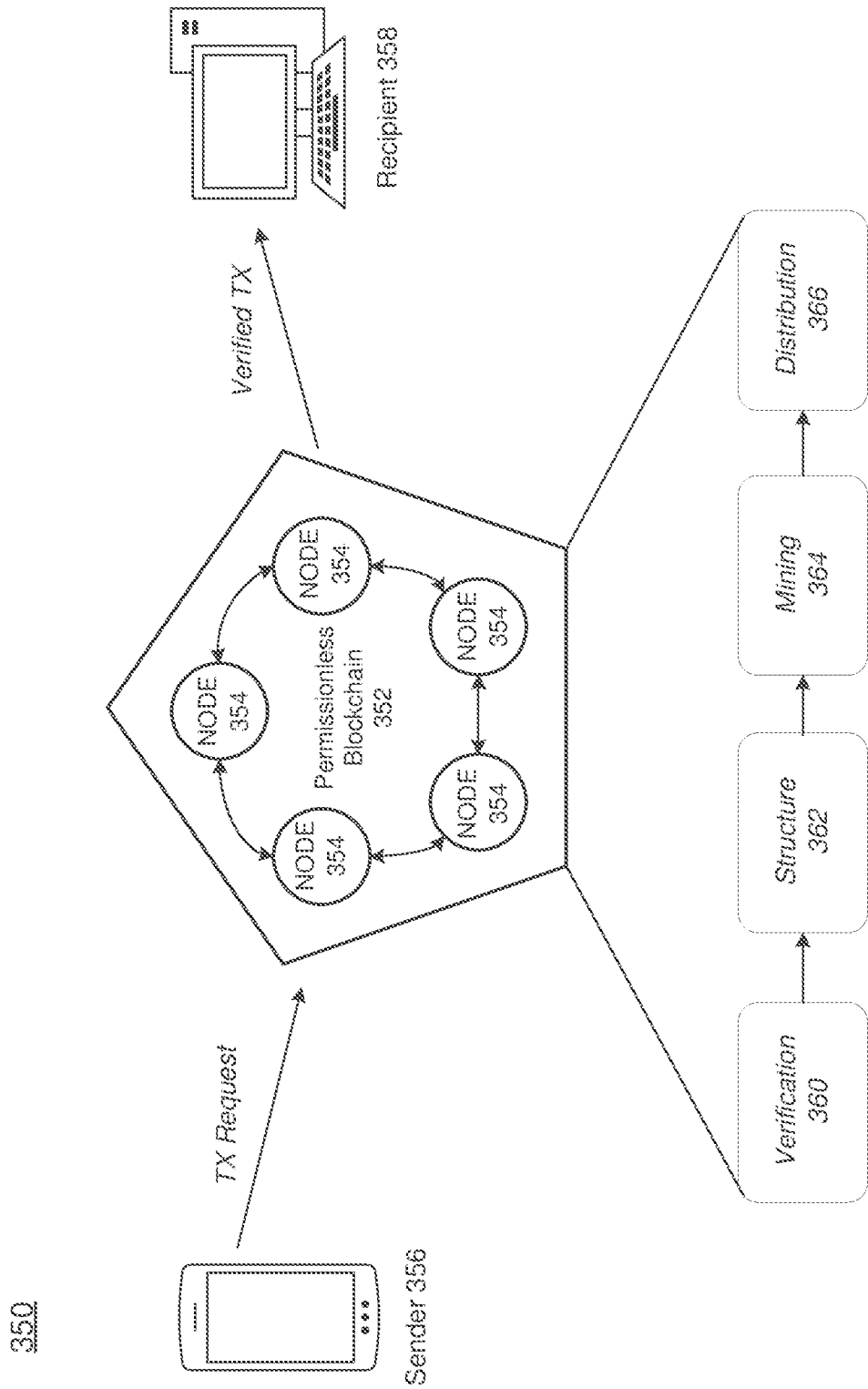
FIG. 3C is a diagram that illustrates a permissionless blockchain network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

FIG. 4A illustrates a process 400A of retrieving a hash from a blockchain 410 for use in randomly selecting endorser organizations according to example embodiments. Referring to FIG. 4A, the random peer selection process is performed by a client 420 that wants to submit a transaction for storage on the blockchain 410. It should also be appreciated that the random organization selection process may be performed by a peer node or other service instead of the client 420. Here, the client 420 may retrieve one or more blocks (and block hashes) from a peer node (not shown) or an ordering service (not shown) of a blockchain network that manages the blockchain 410. The random peer selection process may include a constraint specifying a subset of blocks on the blockchain 410 from which the block hash may be retrieved. In other words, the constraint (also referred to herein as a target interval constraint) may specify a predetermined number of blocks (block interval value 412) that have been most recently added to the blockchain. In this example, the block interval value 412 is equal to five (e.g., T=5). Therefore, the block hash must be retrieved from a block or blocks including within the last five (5) blocks added to the blockchain ledger.

In this example, the client 420 may select the block hash from any of the blocks included in the block interval 412. In some cases, the client 420 may automatically select the most recently added block to the blockchain 410, but embodiments are not limited thereto. To verify that the client 420 has selected a block from within the block interval 412, the client 420 may submit an integrity value which is equal to a current height of the blockchain ledger (i) divided by the block interval value 412 (T). If the blockchain ledger height is fifty (e.g., H=50), and the block interval value is five (e.g., T=5), then the integrity value will be (H/T)=(50/5)=10. FIG. 4B illustrates a block hash 430 of a block selected by the client 420 in FIG. 4A. Here, the block hash 430 includes 256 bits of characters and numbers such as a SHA 256 hash. This hash value 430 may be a seed for a binary random number generator which converts the hash value 430 to a pseudo random binary number 440 based on the value of the block hash 430. The random binary number can be used to identify endorser peers as further described in the example of FIG. 4C.

Referring to FIG. 4B, a process of assigning unique identifiers to peer organizations is shown. In this example, the blockchain network includes sixteen (e.g., N=16) peer organizations. Each peer may be assigned a unique identifier. Therefore, the 16 organizations may be assigned values from 0 to N−1, as shown in the table of unique IDs 450. In this example, each of the unique IDs 450 are represented as decimal values, but may also be represented as binary values.

FIG. 4C illustrates a process 400C of breaking up the random binary number 440 into binary bit segments 441 having a size based on the number of organizations in the blockchain and identifying endorser nodes based on the binary bit segments 441, according to example embodiments. In this example, the random number 440 has 256 bits (same as the hash value 430 used as the seed). To identify organizations, the client 420 may segment the random binary number 440 into smaller chunks or sizes of bits based on a number of organizations in the blockchain network. For example, the logarithmic function log 2(N) bits may dictate the size of the binary bit segments 441. In this example, the bit segment 441 is given a size of log 2(16)=4 bits.

The binary number of the bit segments 441 may be converted into a decimal value that can be mapped to one of the unique IDs 450 of the peer organizations. For example, a first bit segment has a random number of "1011" which can be converted into a decimal value of 11 that maps to peer organization 12's unique ID. This process of converting binary segments into decimal values and mapping them to unique IDs of peer organizations can be repeated until enough unique IDs (and corresponding organizations) have been identified to satisfy an endorsement policy. In this example, the number of endorsers needed is K=4. As a result, organization 12, organization 9, organization 11, and organization 6 are identified from the first four segments of the random binary number 440. Therefore, the process may end, and the client 420 can submit a transaction proposal to nodes of each of the four organizations (12, 9, 11, and 6) identified from the random selection process.

If the conversion of a binary bit segment into a decimal value results in a mapping to a duplicate unique ID of a previous bit segment, the bit segment can be discarded. The system continues to look for the first four distinct unique IDs that can be obtained. If the client 420 runs out of binary bit segments, which may be more common when the number of nodes/endorsers required is larger, then the client 420 may grab another block hash from the block interval 412 or it may rehash the current hash, and generate a new random number and start the process again to identify the remaining number of endorser nodes needed.

Figure 5:
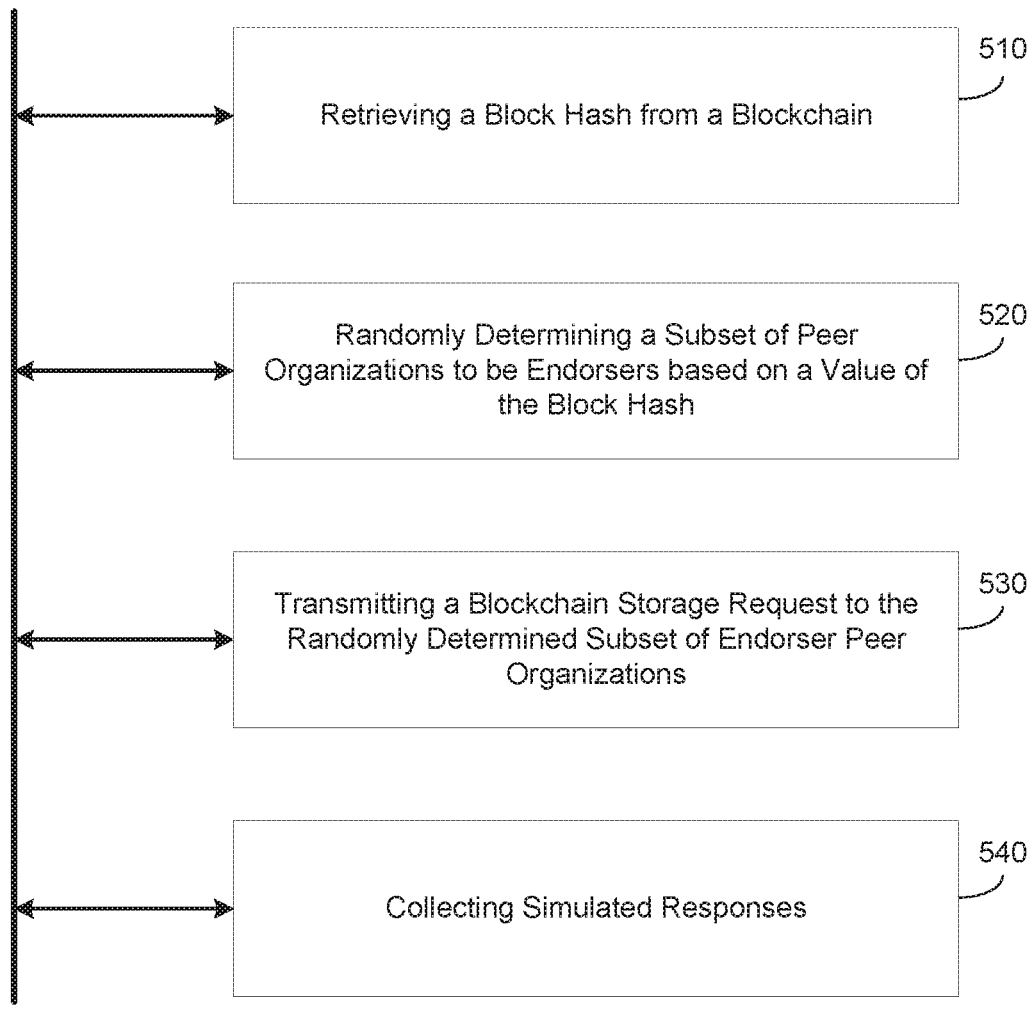
FIG. 5 is a diagram that illustrates a method of randomly selecting peer organizations to be endorsers according to example embodiments.

FIG. 5 illustrates a method 500 of randomly selecting peer organizations to be endorsers according to example embodiments. Referring to FIG. 5, in 510 the method may include retrieving a block hash of a data block stored on a blockchain. For example, a system such as a client, a smart contract, a blockchain peer node, etc. which is performing the method, may be restricted to choosing a block hash from a most recently stored predetermined amount of blocks. The interval of blocks may be referred to as a block interval value. For example, if the block interval value is 10, then the method may only select a block hash from one or more blocks from among the last 10 blocks stored on the blockchain. In doing so, security protects against an attacker using an older/stale hash.

In 520, the method may include randomly determining a subset of peer organizations from a blockchain network of the blockchain to be endorsers based on a value of the block hash. For example, the randomly determining may include converting the block hash into a random binary number, breaking-up the random binary number into a plurality of bit segments, and identifying the subset of peer organizations based on one or more of the plurality of bit segments.

In 530, the method may include transmitting a blockchain storage request from a client to the randomly determined subset of endorser peer nodes. Furthermore, in 540, the method may include collecting simulated responses from the randomly determined subset of endorser peer nodes into a storage request proposal. Although not shown in FIG. 5, in some embodiments, the method may further include transmitting the storage request proposal including the collected simulated responses from the randomly determined subset of endorser peer nodes to an orderer service of the blockchain.

According to various embodiments, the identifying may include assigning each peer node from among the plurality of peer nodes a unique identifier based on how many peer nodes are included within the blockchain network, converting a bit segment from the plurality of bit segments into a decimal value, and mapping the decimal value of the bit segment to a unique identifier of one of the peer nodes. The bit segments may be a specific size of bits that are sliced off of the binary random number sequence. The system may then identify which organization corresponds to the unique identifier and select a peer from that organization as an endorser node for a transaction. In some embodiments, the size of the bit segment may be selected based on how many organizations are included within the blockchain network.

In some embodiments, the method may further include determining a block interval value which identifies a subset of most recent blocks on the blockchain from where the block hash can be retrieved. In some embodiments, the method may further include selecting a block within the subset of most recent blocks identified by the block interval value, and retrieving the block hash from the selected block within the subset of blocks identified by the block interval value. In some embodiments, the method may further include generating an integrity value based on a current height of the blockchain and the block interval value and storing the integrity value within the storage request proposal. The storage request proposal may be transmitted to an orderer node which includes the storage request proposal in a data block, and distributes the data block to the committing nodes of the blockchain where it can be stored on the blockchain ledger.

According to various embodiments, the method 500 may include additional steps not expressly shown in FIG. 5. For example, the client may assemble the responses into a transaction proposal, and send the transaction proposal to an ordering service of the blockchain. The ordering service may add the transaction proposal to a block and transmit the block to all committing peer nodes within the blockchain network. In response, each of the committing peers may verify whether the transaction included in the block was simulated and endorse by peers according to the random selection process. If the check is successful, the transaction is added to the ledger by the committing peers, otherwise the transaction is not added.

Figure 6A:
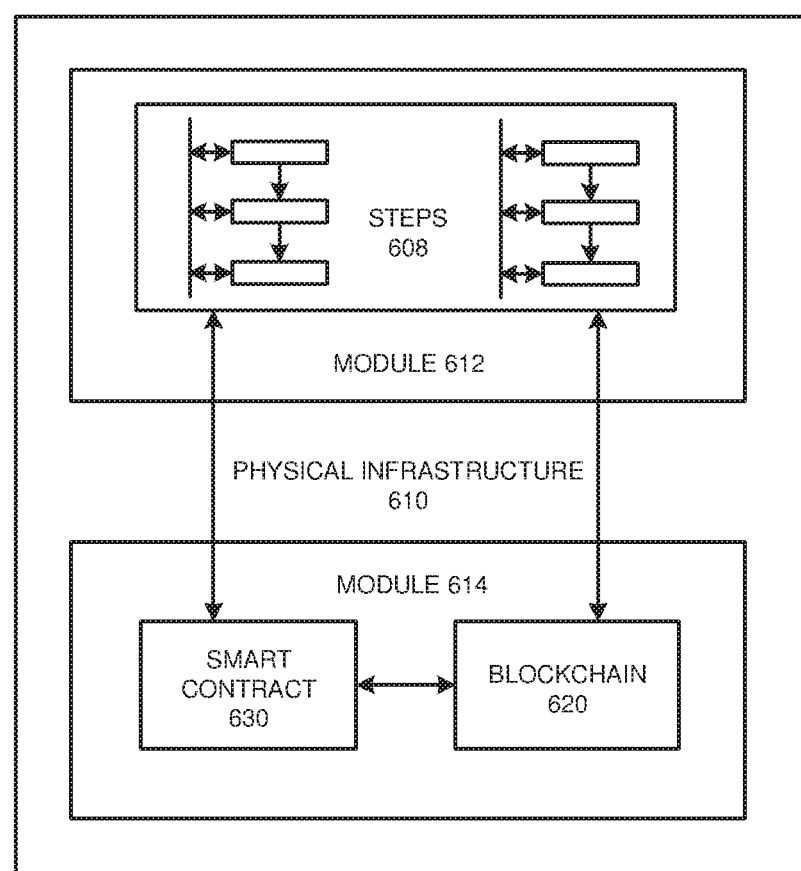
FIG. 6A is a diagram that illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
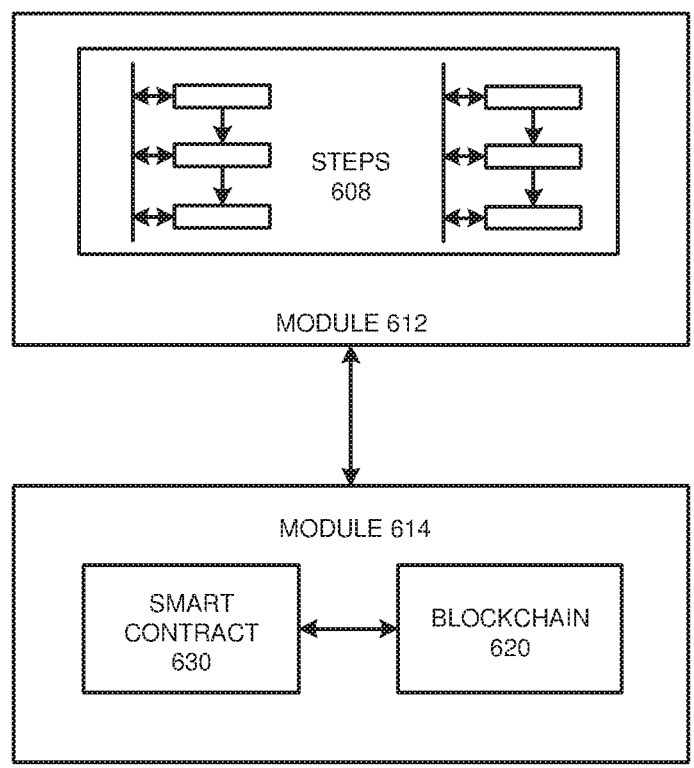
FIG. 6B is a diagram that illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
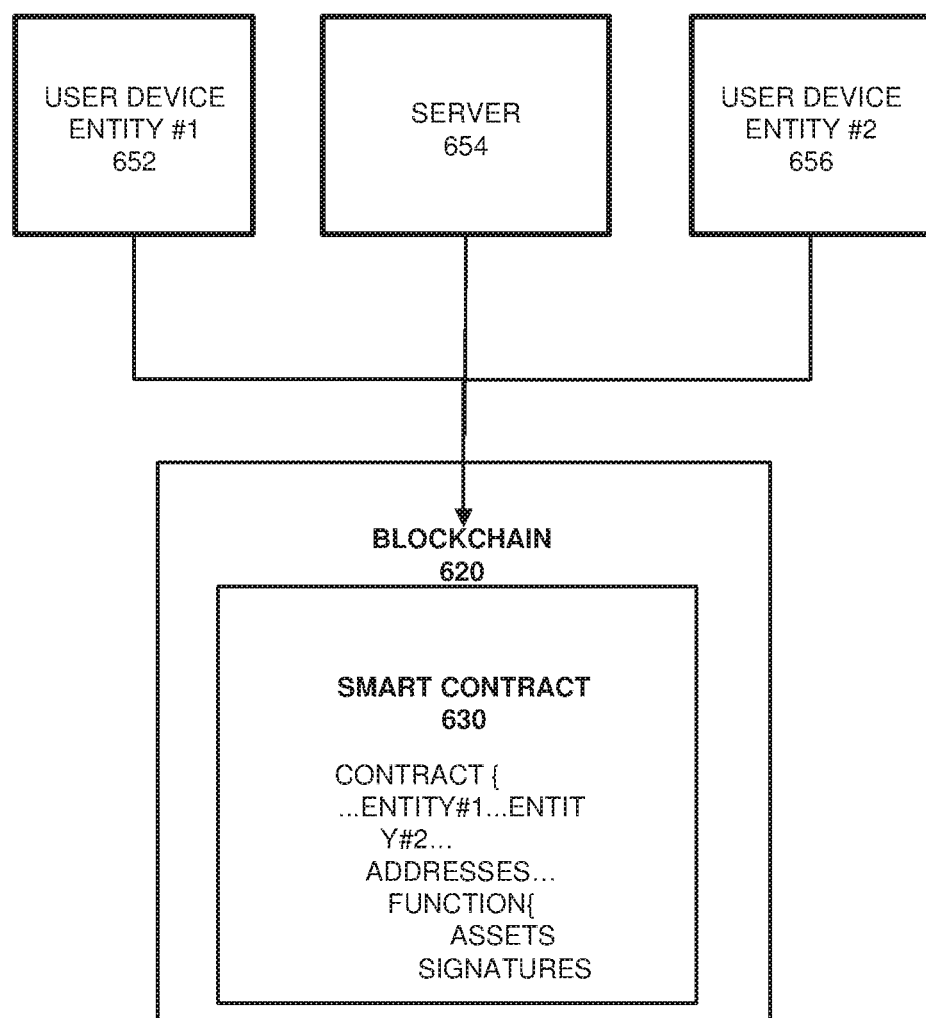
FIG. 6C is a diagram that illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
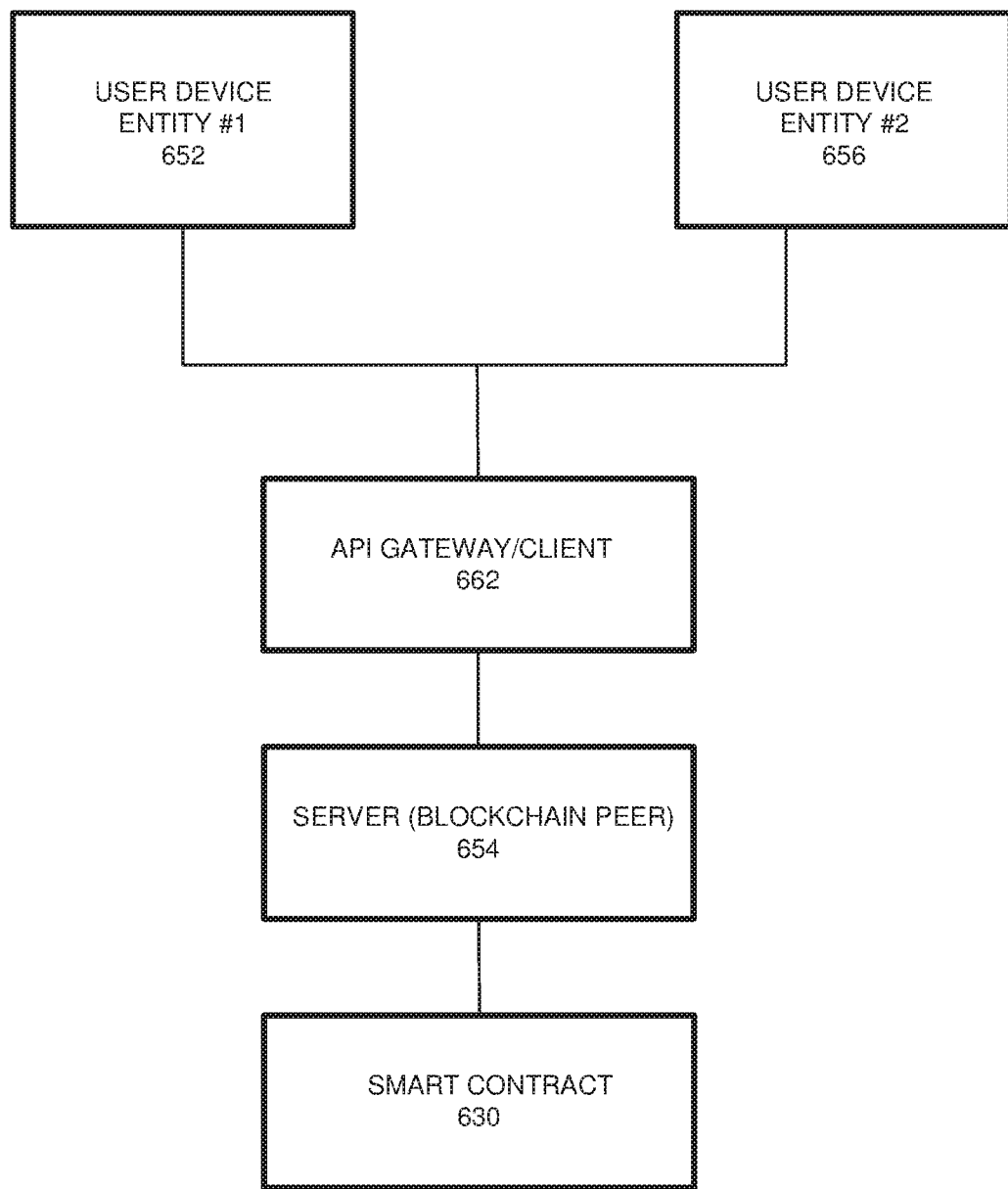
FIG. 6D is a diagram that illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
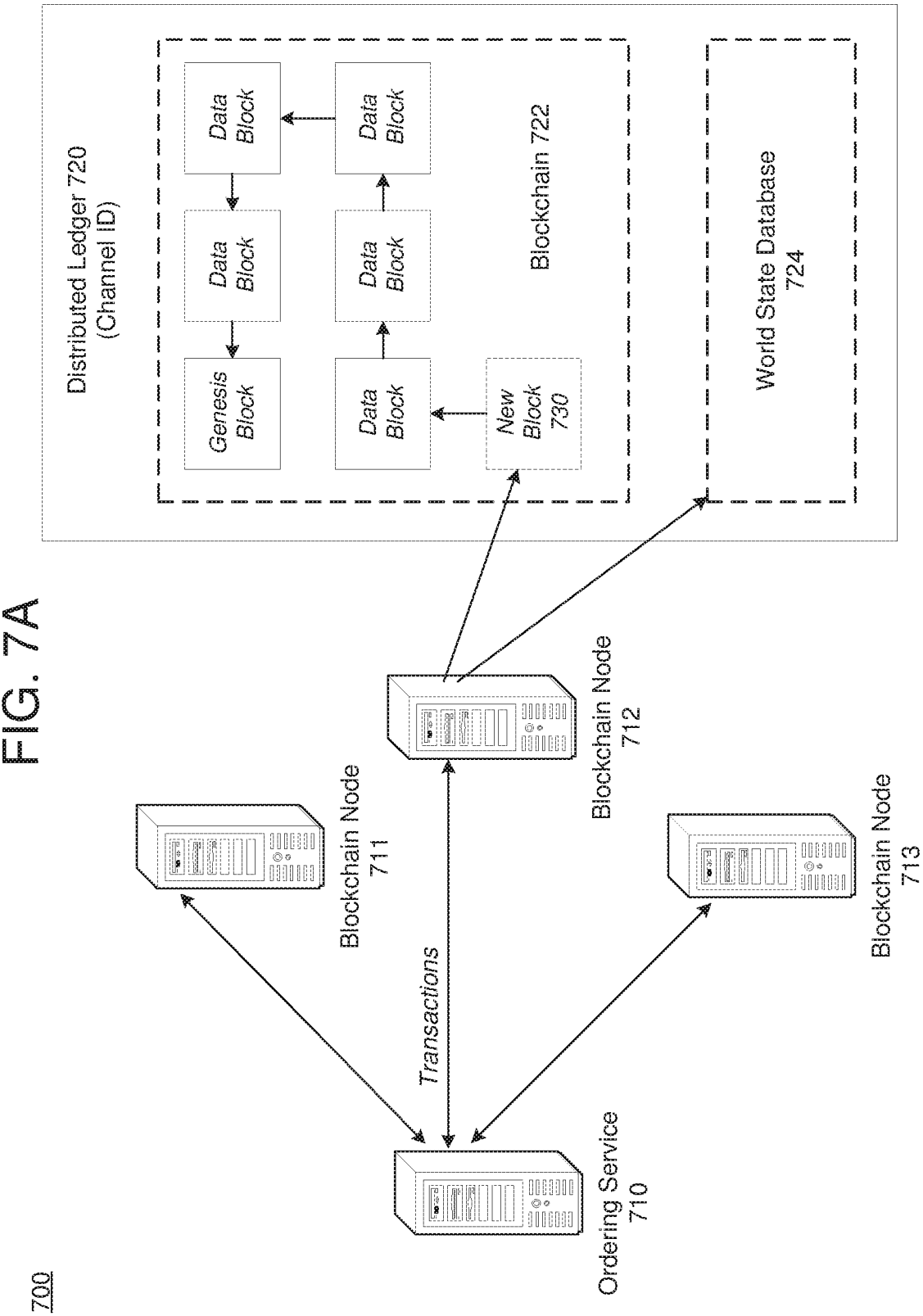
FIG. 7A is a diagram that illustrates a process of a new block being added to a distributed ledger, according to example embodiments.
Figure 7B:
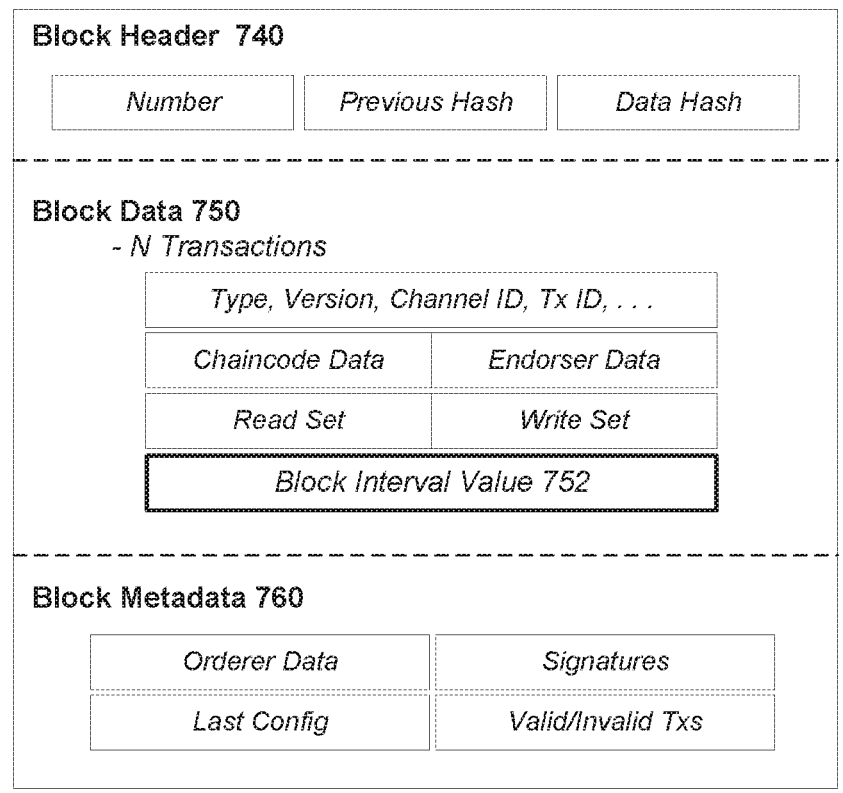
FIG. 7B is a diagram that illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, each transaction included in the block data 750 may also store a block interval value 752 which is equal to a block height of a peer node that submitted the transaction divided by the block interval value of the blockchain. The block interval value 752 can be used to verify that the randomized endorser node selection process was performed using a block hash value from a block that is within the block interval value 752. The block interval value 752 includes one or more of the steps, features, processes and/or actions described or depicted herein. Accordingly, the block interval value 752 can be stored in an immutable log of blocks on the distributed ledger 720. Some of the benefits of storing the block interval value 752 on the blockchain are reflected in the various embodiments disclosed and depicted herein and include ensuring the integrity of the random peer selection process.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid.

Figure 7C:
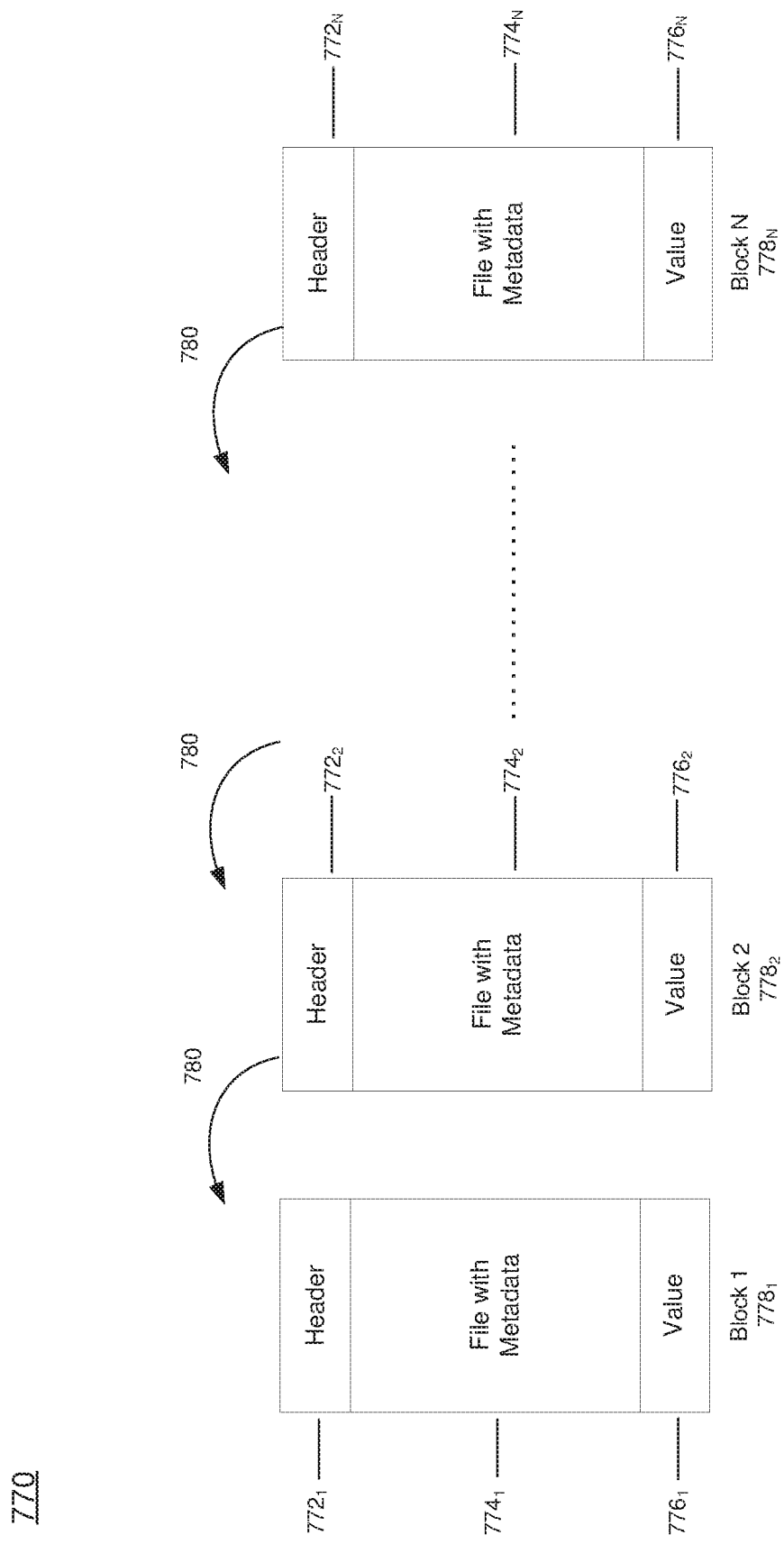
FIG. 7C is a diagram that illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| . | . |
| Block N Hash Value | Block N Hash Value ... Content |

In the example embodiment of FIG. 7C, the blockchain 770 includes a number of blocks $778_1$, $778_2$, ... $778_N$ cryptographically linked in an ordered sequence, where N≥1. The encryption used to link the blocks $778_1$, $778_2$, ... $778_N$ may be any of a number of keyed or un-keyed Hash functions. In one embodiment, the blocks $778_1$, $778_2$, ... $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, ..., $778_N$ may be cryptographically linked by a function that is different from a hash function. For purposes of illustration, the following description is made with reference to a hash function, e.g., SHA-2.

Each of the blocks $778_1$, $778_2$, ..., $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:
1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
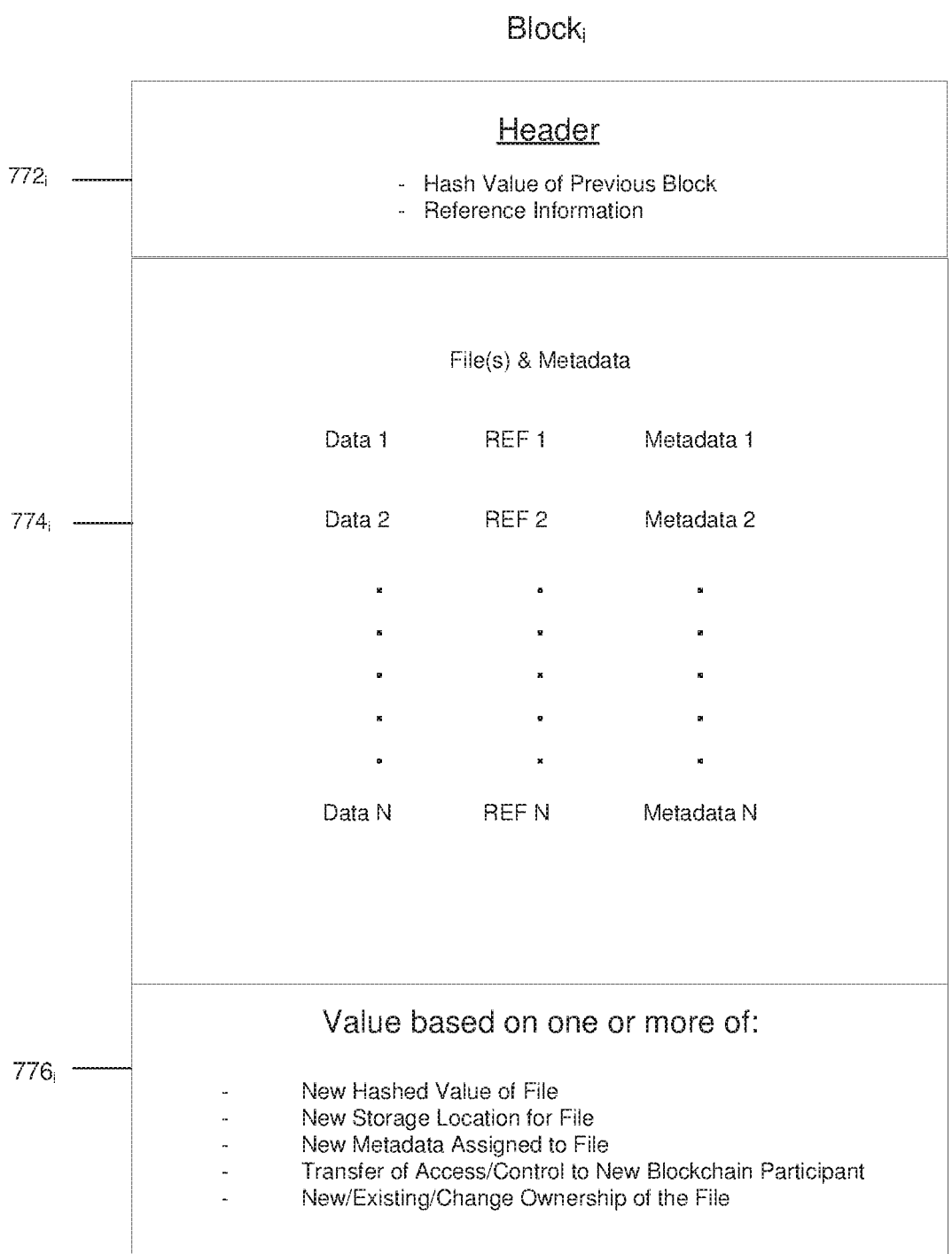
FIG. 7D is a diagram that illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.
a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, ..., Data N in sequence. The data are tagged with metadata Metadata 1, Metadata 2, ..., Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
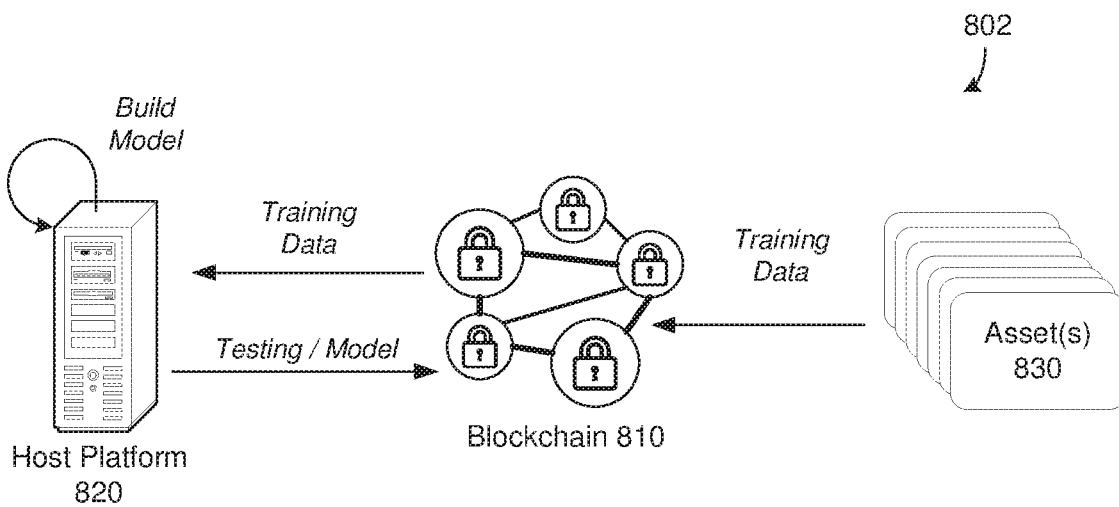
FIG. 8A is a diagram that illustrates an example blockchain which stores machine learning (artificial intelligence) data, according to example embodiments.
Figure 8A:
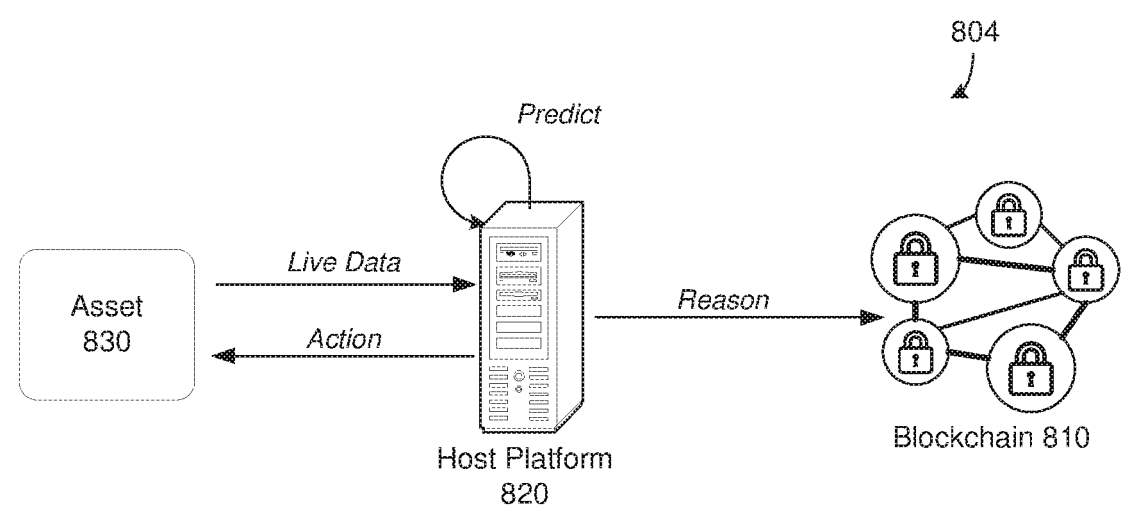
Figure 8B:
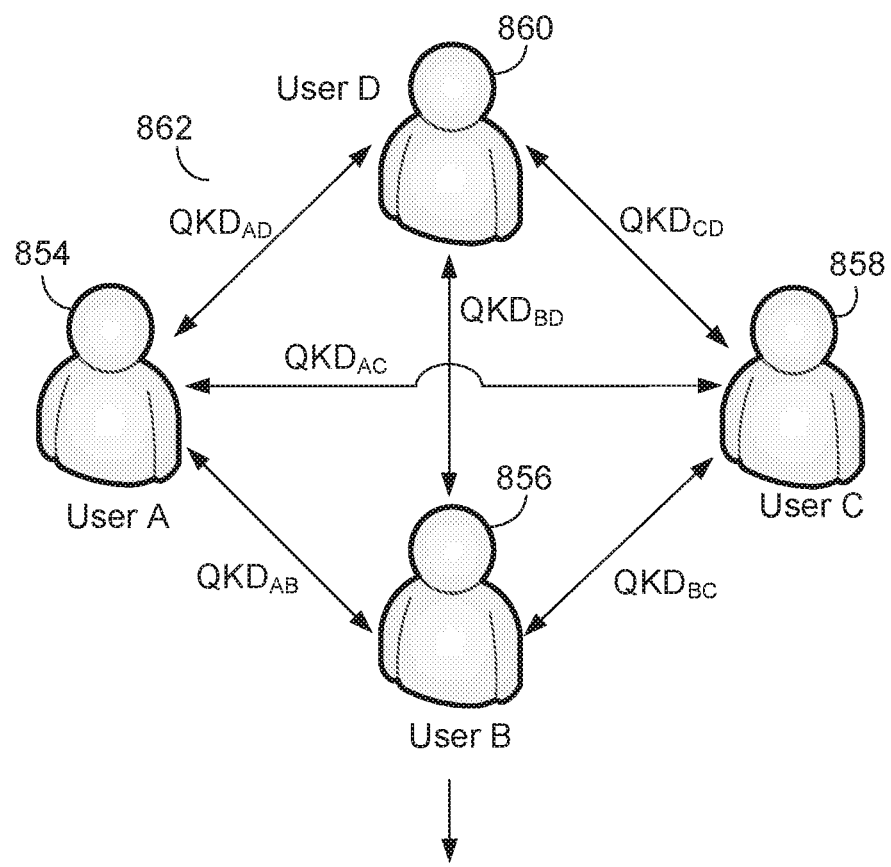
FIG. 8B is a diagram that illustrates an example quantum-secure blockchain, according to example embodiments.
Figure 8B:
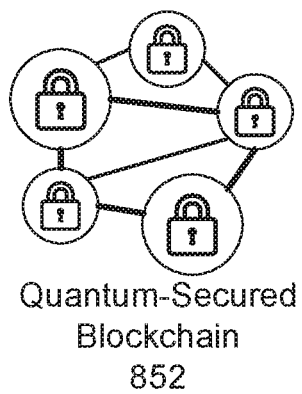

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster ($1000s$ of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including QKDAB, QKDAc, QKDAD, QKDBc, QKDBD, and QKDcD. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
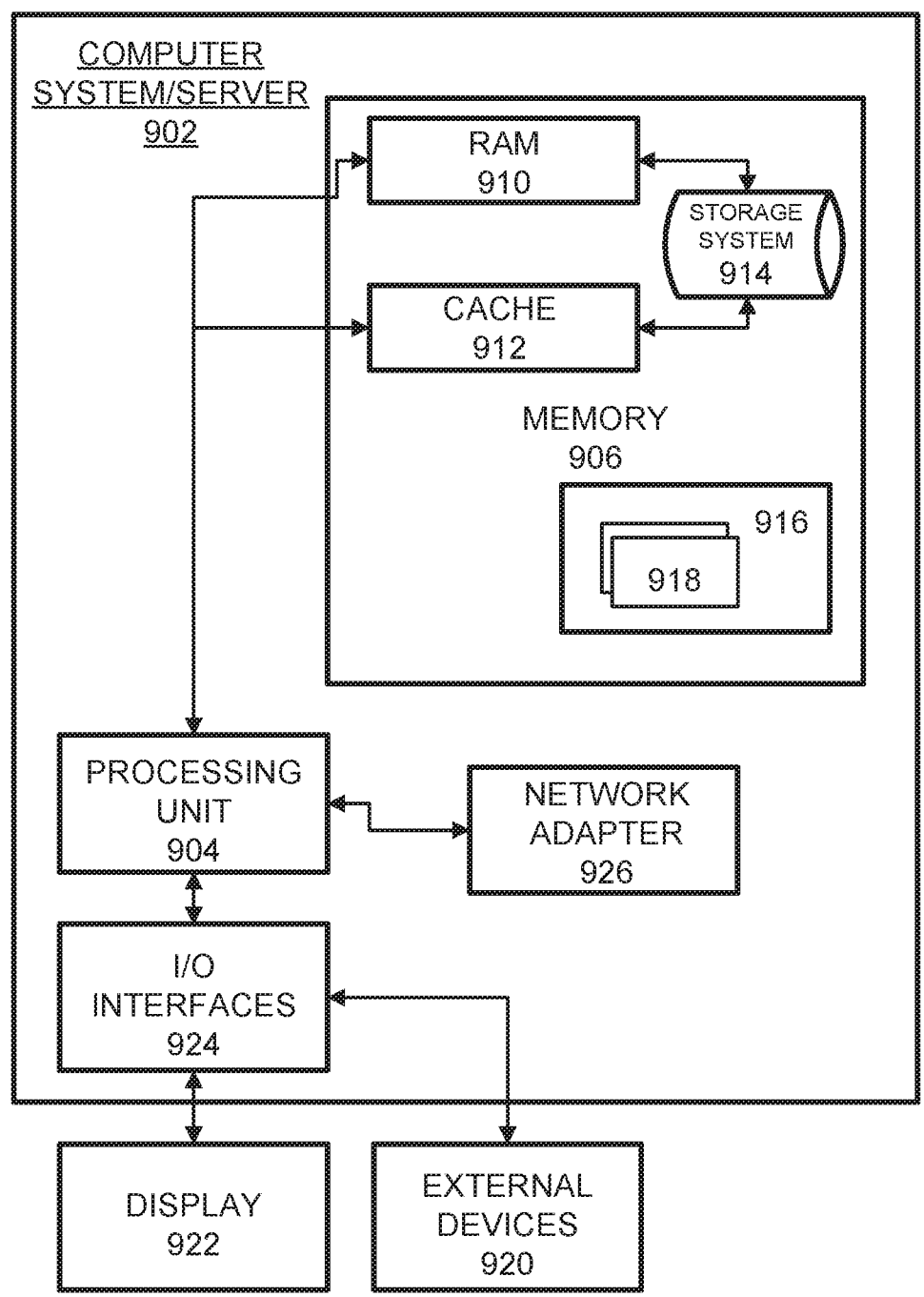
FIG. 9 is a diagram that illustrates an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
a processor configured to retrieve a block hash of a data block stored on a blockchain, randomly determine a subset of peer organizations from a blockchain network of the blockchain based on a value of the block hash, and transmit a blockchain storage request from a client to the randomly determined subset of endorser peer organizations; and
a network interface configured to collect simulated responses from the randomly determined subset of endorser peer organizations into a storage request proposal;
wherein the randomly determine comprises the processor configured to break up a random number related to the block hash into a plurality of bit segments and identify the subset of peer organizations based on one or more of the plurality of bit segments.

2. The apparatus of claim 1, wherein the processor is configured to convert the block hash into the random number.

3. The apparatus of claim 2, wherein the processor is configured to assign to each peer organization from among the plurality of peer organizations a unique identifier based on how many peer organizations are included within the blockchain network, convert a bit segment from the plurality of bit segments into a decimal value, and map the decimal value of the bit segment to a unique identifier of one of the peer organizations.

4. The apparatus of claim 2, wherein the processor is further configured to select a size of the bit segment based on how many peer organizations are included within the blockchain network.

5. The apparatus of claim 1, wherein the processor is further configured to determine a block interval value which identifies a subset of most recent blocks on the blockchain from where the block hash can be retrieved.

6. The apparatus of claim 5, wherein the processor is configured to select a block within the subset of most recent blocks identified by the block interval value, and retrieve the block hash from the selected block within the subset of most recent blocks identified by the block interval value.

7. The apparatus of claim 6, wherein the processor is further configured to generate an integrity value based on a current height of the blockchain and the block interval value and stores the integrity value within the storage request proposal.

8. The apparatus of claim 1, wherein the network interface is further configured to transmit the storage request proposal which includes the collected simulated responses from the randomly determined subset of endorser peer organizations to an orderer service of the blockchain.

9. A method comprising:
retrieving a block hash of a data block stored on a blockchain;
randomly determining a subset of peer organizations from a blockchain network of the blockchain to be endorsers based on a value of the block hash;
transmitting a blockchain storage request from a client to the randomly determined subset of endorser peer organizations; and
collecting simulated responses from the randomly determined subset of endorser peer organizations into a storage request proposal;
wherein the randomly determining comprises breaking up a random number related to the block hash into a plurality of bit segments and identifying the subset of peer organizations based on one or more of the plurality of bit segments.

10. The method of claim 9, wherein the randomly determining comprises converting the block hash into the random number.

11. The method of claim 10, wherein the identifying comprises assigning each peer organization from among the plurality of peer nodes a unique identifier based on how many peer nodes are included within the blockchain network, converting a bit segment from the plurality of bit segments into a decimal value, and mapping the decimal value of the bit segment to a unique identifier of one of the peer organizations.

12. The method of claim 10, further comprising selecting a size of the bit segment based on how many peer organizations are included within the blockchain network.

13. The method of claim 9, further comprising determining a block interval value which identifies a subset of most recent blocks on the blockchain from where the block hash can be retrieved.

14. The method of claim 13, further comprising selecting a block within the subset of most recent blocks identified by the block interval value, and retrieving the block hash from the selected block within the subset of blocks identified by the block interval value.

15. The method of claim 14, further comprising generating an integrity value based on a current height of the blockchain and the block interval value and storing the integrity value within the storage request proposal.

16. The method of claim 9, further comprising transmitting the storage request proposal including the collected simulated responses from the randomly determined subset of endorser peer nodes to an orderer service of the blockchain.

17. A non-transitory computer-readable medium comprising instructions, that when read by a processor, cause the processor to perform a method comprising:
retrieving a block hash of a data block stored on a blockchain;
randomly determining a subset of peer organizations from a blockchain network of the blockchain to be endorsers based on a value of the block hash;
transmitting a blockchain storage request from a client to the randomly determined subset of endorser peer organizations; and
collecting simulated responses from the randomly determined subset of endorser peer organizations into a storage request proposal;
wherein the randomly determining comprises breaking up a random number related to the block hash into a plurality of bit segments and identifying the subset of peer organizations based on one or more of the plurality of bit segments.

18. The non-transitory computer-readable medium of claim 17, wherein the randomly determining comprises converting the block hash into the random number.

19. The non-transitory computer-readable medium of claim 18, wherein the identifying comprises assigning each peer organization from among the plurality of peer nodes a unique identifier based on how many peer organizations are included within the blockchain network, converting a bit segment from the plurality of bit segments into a decimal value, and mapping the decimal value of the bit segment to a unique identifier of one of the peer organizations.

20. The non-transitory computer-readable medium of claim 18, further comprising selecting a size of the bit segment based on how many peer organizations are included within the blockchain network.

* * * * *